US012792299B2

(12) United States Patent
Hu et al.

(10) Patent No.: US 12,792,299 B2
(45) Date of Patent: Nov. 10, 2026

(54) SOUND EFFECT DISPLAY METHOD AND TERMINAL DEVICE

(71) Applicant: Beijing Zitiao Network Technology Co., Ltd., Beijing (CN)

(72) Inventors: Shun Hu, Beijing (CN); Chaopeng Liu, Beijing (CN); Yipeng Huang, Beijing (CN); Xiaoyu Zhu, Beijing (CN); Kexin Lin, Los Angeles, CA (US); Zihao Chen, Los Angeles, CA (US); Chenyu Sun, Los Angeles, CA (US)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 18/695,307

(22) PCT Filed: Sep. 14, 2022

(86) PCT No.: PCT/CN2022/118618
§ 371 (c)(1),
(2) Date: Mar. 25, 2024

(87) PCT Pub. No.: WO2023/071572
PCT Pub. Date: May 4, 2023

(65) Prior Publication Data

US 2025/0004710 A1 Jan. 2, 2025

(30) Foreign Application Priority Data

Oct. 25, 2021 (CN) ......................... 202111252102.9

(51) Int. Cl.
*G06F 3/16* (2006.01)
*G06F 3/0481* (2022.01)

(52) U.S. Cl.
CPC ............ *G06F 3/167* (2013.01); *G06F 3/0481* (2013.01)

(58) Field of Classification Search
CPC ................................ G06F 3/167; G06F 3/0481
See application file for complete search history.

(56) References Cited

U.S. PATENT DOCUMENTS

| | | | | |
|---|---|---|---|---|
| 8,751,933 B2 * | 6/2014 | Perrodin | G11B 27/034 | 715/723 |
| 2008/0314228 A1 * | 12/2008 | Dreyfuss | G09B 15/00 | 84/477 R |

(Continued)

FOREIGN PATENT DOCUMENTS

| | | |
|---|---|---|
| CN | 106228994 A | 12/2016 |
| CN | 106468997 A | 3/2017 |

(Continued)

OTHER PUBLICATIONS

International Search Report and Written Opinion received for PCT/CN2022/118618, mailed Nov. 2, 2022, 18 pages.

(Continued)

*Primary Examiner* — Cao H Nguyen
(74) *Attorney, Agent, or Firm* — Astute IP Law Group

(57) ABSTRACT

A sound effect display method and a terminal device including: receiving a first operation input to a target audio file; displaying a sound effect display interface corresponding to the target audio file in response to the first operation, the sound effect display interface includes a cover image corresponding to the target audio file and a plurality of sound wave columns arranged along the edge of the cover image; and the cover image is scaled up or scaled down according to a preset sound attribute of the target audio file, and the plurality of sound wave columns extend to an area where the cover image is located according to the preset sound attribute of the target audio file in a direction perpendicular to the (Continued)

edge of the cover image to form a sound wave waveform corresponding to the preset sound attribute of the target audio file.

19 Claims, 4 Drawing Sheets

(56) References Cited

U.S. PATENT DOCUMENTS

| | | | | |
|---|---|---|---|---|
| 2016/0266731 | A1 | 9/2016 | Zhao et al. | |
| 2020/0396560 | A1 * | 12/2020 | Family | H04S 7/305 |

FOREIGN PATENT DOCUMENTS

| | | | | |
|---|---|---|---|---|
| CN | 107122153 | A | 9/2017 | |
| CN | 109597664 | A | 4/2019 | |
| CN | 109814956 | A | 5/2019 | |
| CN | 110347456 | A | 10/2019 | |
| CN | 110609649 | A | 12/2019 | |
| CN | 111026907 | A | 4/2020 | |
| CN | 112464019 | A * | 3/2021 | G06F 16/64 |
| CN | 112738606 | A | 4/2021 | |
| CN | 113885829 | A | 1/2022 | |
| CN | 114003150 | A | 2/2022 | |
| WO | 2016141511 | A1 | 9/2016 | |

OTHER PUBLICATIONS

Office Action received for Chinese Patent Application No. 202111252102.9, mailed on Apr. 14, 2023, 30 pages.

* cited by examiner

SOUND EFFECT DISPLAY METHOD AND TERMINAL DEVICE

This is a national stage application based on International Patent Application No. PCT/CN2022/118618, filed Sep. 14, 2022, which claims priority to Chinese patent application No. 202111252102.9 filed on Oct. 25, 2021 entitled "A SOUND EFFECT DISPLAY METHOD AND TERMINAL DEVICE", the disclosures of which are incorporated herein by reference in their entireties.

TECHNICAL FIELD

The present application relates to the technical field of terminals, and in particular to a sound effect display method and a terminal device.

BACKGROUND

With the continuous development of the multimedia technology, users are no longer satisfied only with the status that a playing device can provide an audio or video files restored at high-precision, but put forward a new requirement for the overall feeling on the playing content.

At present, most of audio playing applications (Applications) have focused on the users' listening experience when an audio is played, but overlook the effect of the visual experience of the sound effect display interface on the overall feeling of the audio playing. Because the effect of the visual experience of the sound effect display interface on the overall feeling of the audio playing is not considered, many audio playing applications display a very monotonous image in the display screen of a terminal device in scenes such as playing audio files. For example, some music playing applications always display a static picture associated with the played music on the music player interface when playing songs. However, the visual experience of the sound effect display interface has a very important influence on the overall experience of the audio playing, and thus how to improve the visual experience of the sound effect display interface is also a very important research topic.

SUMMARY

In view of the above, embodiments of the present application provide a sound effect display method and a terminal device, which are used for improving the visual experience of a sound effect display interface.

In order to achieve the objective above, the embodiments of the present application provide the following technical solutions.

In a first aspect, an embodiment of the present application provides a sound effect display method, including: receiving a first operation that is input to a target audio file; and displaying a sound effect display interface corresponding to the target audio file in response to the first operation. The sound effect display interface includes a cover image corresponding to the target audio file and a plurality of sound wave columns arranged along an edge of the cover image; the cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file.

In a second aspect, an embodiment of the present application provides a terminal device, including: a receiving unit configured to receive a first operation that is input to a target audio file; and a displaying unit configured to display a sound effect display interface corresponding to the target audio file in response to the first operation. The sound effect display interface includes a cover image corresponding to the target audio file and a plurality of sound wave columns arranged along an edge of the cover image; the cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file.

In a third aspect, an embodiment of the present application provides an electronic apparatus including a memory and a processor, the memory is configured for storing a computer program; and the processor is configured to enable the electronic apparatus to realize the sound effect display method described in any of the above-described embodiments upon the processor calling the computer program.

In a fourth aspect, an embodiment of the present application provides a computer-readable storage medium, a computer program is stored thereon, the computer program enables a computing apparatus to realize the sound effect display method described in any of the above-described embodiments upon the computer program being executed by the computing apparatus.

In a fifth aspect, an embodiment of the present application provides a computer program product, which enables a computer to realize the sound effect display method described in any of the above-described embodiments upon the computer program product being executed on the computer.

According to the sound effect display method provided by the embodiment of the present application, when a first operation that is input to a target audio file is received, a sound effect display interface corresponding to the target audio file is displayed in response to the first operation. The sound effect display interface includes a cover image corresponding to the target audio file and a plurality of sound wave columns arranged along an edge of the cover image, the cover image is scaled up or scaled down according to a preset sound attribute of the target audio file, the plurality of sound wave columns extend towards an area where the cover image is located along a direction perpendicular to the edge of the cover image according to the preset sound attribute of the target audio file to form a sound wave waveform corresponding to the preset sound attribute of the target audio file. Therefore, the embodiments of the present application enable a rhythm of the sound effect display interface according to the preset sound attribute of the target audio file, thereby improving the visual experience of the sound effect display interface.

BRIEF DESCRIPTION OF THE DRAWINGS

The accompanying drawings herein are incorporated into and constitute a part of this specification, which illustrate the embodiments in conformity with the present application and serve to explain the principles of the present application together with the description.

To illustrate the technical solutions in embodiments of the present application or the related art more clearly, the accompanying drawings which are required to describe the embodiments or the related art will be briefly described below. Apparently, for one of ordinary skill in the art, other drawings can be obtained on the basis of these drawings without any creative work.

DETAILED DESCRIPTION

To understand the above objects, features, and advantages more clearly, the solutions of the present application will be further described below. It is to be noted that, without conflicting with each other, the embodiments and features in embodiments of the present application can be combined with each other.

Many particular details are set forth in the following description to sufficiently understand the present application, but the present application can be implemented by other ways than those described herein. Apparently, the embodiments in the description are merely some, not all embodiments of the present application.

In the embodiments of the present application, the terms like “exemplary” or “for example/such as”, etc. are used to represent an example, exemplary illustration, or explanation. Any embodiment or design described as being “exemplary” or “for example/such as” should not be construed to be more preferable or advantageous over other embodiments or designs. Specifically, the use of the terms “exemplary” or “fox example/such as” is intended to present an associated concept in a specific manner. In addition, in the description of the embodiments of the present application, “a plurality of/multiple” refers to two or more, unless otherwise specified.

Figure 1:
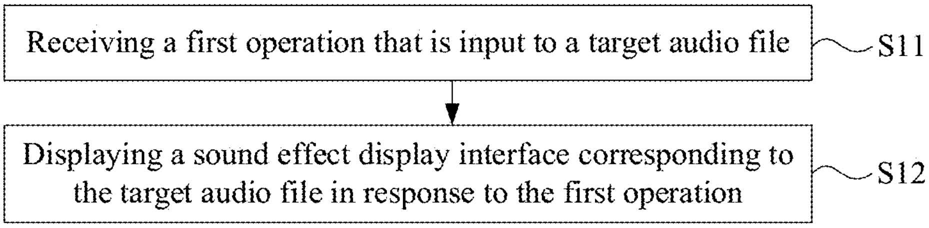
FIG. 1 is a flowchart of steps of a sound effect display method provided by an embodiment of the present application.

Based on the above contents, an embodiment of the present application provides a sound effect display method. Referring to FIG. 1, the sound effect display method includes the following steps.

S11, receiving a first operation that is input to a target audio file.

The first operation in the embodiment of the present application may be an operation for triggering to play the target audio file, or an operation for sharing the target audio file, and may also be an operation for generating and previewing a sound effect display interface of the target audio file. Particularly, the first operation can be a click operation on the target audio file, or a voice command, or a specific gesture. In some embodiments of the present application, the specific gesture may be any one of a click gesture, a swipe gesture, a pressure recognition gesture, a long-press gesture, an area-change gesture, a double press gesture, and a double click gesture.

S12, displaying a sound effect display interface corresponding to the target audio file in response to the first operation.

The sound effect display interface includes a cover image corresponding to the target audio file and a plurality of sound wave columns arranged along an edge of the cover image. The cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file.

In some implementations, the preset sound attribute of the target audio file in the embodiment of the present application can be a loudness of the sound corresponding to the target audio file, a tone of the sound corresponding to the target audio file, etc, which is not limited in the embodiment of the present application.

In some implementations, the cover image is scaled up or scaled down according to the preset sound attribute of the target audio file, which includes the case that the cover image is scaled up or scaled down according to a scaling factor row corresponding to a scaling factor corresponding to an attribute value of the preset sound attribute of a key audio frame of the target audio file. The scaling factor corresponding to the attribute value of the preset sound attribute of the key audio frame of the target audio file is determined according to a pre-established corresponding relationship between the scaling factor and the attribute value of the preset sound attribute.

In some implementations, the implementation of controlling the cover image to be scaled up or scaled down according to the preset sound attribute of the target audio file may include: establishing a corresponding relationship between the scaling factor and the attribute value of the preset sound attribute in advance, acquiring the attribute value of the preset sound attribute of a key audio frame of the target audio file, determining a scaling factor corresponding to the acquired attribute value of the preset sound attribute of the key audio frame according to the corresponding relationship established in advance, and controlling the cover image to be scaled up or scaled down according to the scaling factor corresponding to the acquired attribute value of the preset sound attribute of the key audio frame.

In some implementations, the plurality of sound wave columns extend towards the area where the cover image is located along the direction perpendicular to the edge of the cover image according to the preset sound attribute of the target audio file, which includes the case that the plurality of sound wave columns extend towards the area where the cover image is located along the direction perpendicular to the edge of the cover image according to a determined extension length; an extension length of each sound wave column is determined according to a waveform corresponding to the attribute value of the preset sound attribute of the key audio frame of the target audio file.

In some implementations, the implementation of controlling the plurality of sound wave columns to extend towards the area where the cover image is located according to the preset sound attribute of the target audio file may include: acquiring the attribute value of the preset sound attribute of the key audio frame of the target audio file, calculating the waveform corresponding to the attribute value of the preset sound attribute of the key audio frame according to a preset algorithm, determining the extension length of each sound wave column according to the calculated waveform, and controlling each sound wave column to extend towards the area where the cover image is located according to the extension length of each sound wave column.

Exemplarily, the key audio frame of the target audio file may be an audio frame located at a preset position in the target audio file, for example, an even-numbered audio frame in the target audio file.

It is to be noted that when the first operation is a different operation to the target audio file, the sound effect display interface is a different display interface of the target audio file. For example, when the first operation is a playing operation to the target audio file, the sound effect display interface can be a playing interface of the target audio file. For another example, when the first operation is a sharing operation to the target audio file, the sound effect display interface can be a sharing preview interface of the target audio file.

Figure 2:
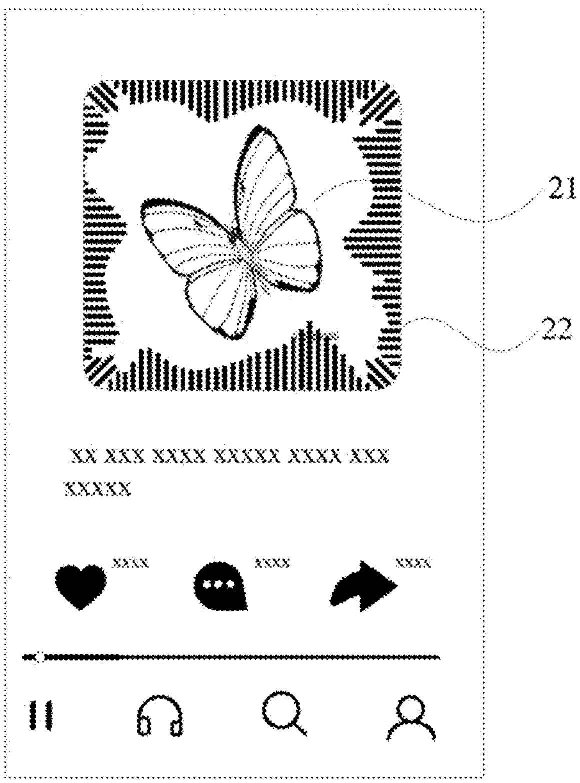
FIG. 2 is a schematic diagram of a sound effect display interface provided by an embodiment of the present application.

Exemplarily, referring to FIG. 2, the sound effect display interface includes a cover image 21 corresponding to the target audio file and a plurality of sound wave columns 22 arranged along an edge of the cover image. The cover image 21 is scaled up or scaled down according to a preset sound attribute of the target audio file, and the plurality of sound wave columns 22 extend towards an area where the cover image is located along a direction perpendicular to the edge of the cover image 22 according to the preset sound attribute of the target audio file to form a sound wave waveform corresponding to the preset sound attribute of the target audio file.

It is to be noted that the attribute parameters, such as the number, the width and the spacing distance of the sound wave columns in the sound effect display interface are not limited in the embodiment of the present application, but can be set as any values according to requirements in actual implementation.

It is also to be noted that the cover image 21 is illustrated as a rectangular image in FIG. 2 by way of example, but the embodiment of the present application is not limited to this, and the cover image 21 in the embodiment of the present application can also be an image with other shapes, such as a circle, a hexagon, an ellipse, an irregular shape, etc.

According to the sound effect display method provided by the embodiment of the present application, when a first operation that is input to a target audio file is received, a sound effect display interface corresponding to the target audio file is displayed in response to the first operation. The sound effect display interface includes a cover image corresponding to the target audio file and a plurality of sound wave columns arranged along an edge of the cover image, the cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file. Therefore, the embodiments of the present application enable a rhythm of the sound effect display interface according to the preset sound attribute of the target audio file, thereby improving the visual experience of the sound effect display interface.

Figure 3:
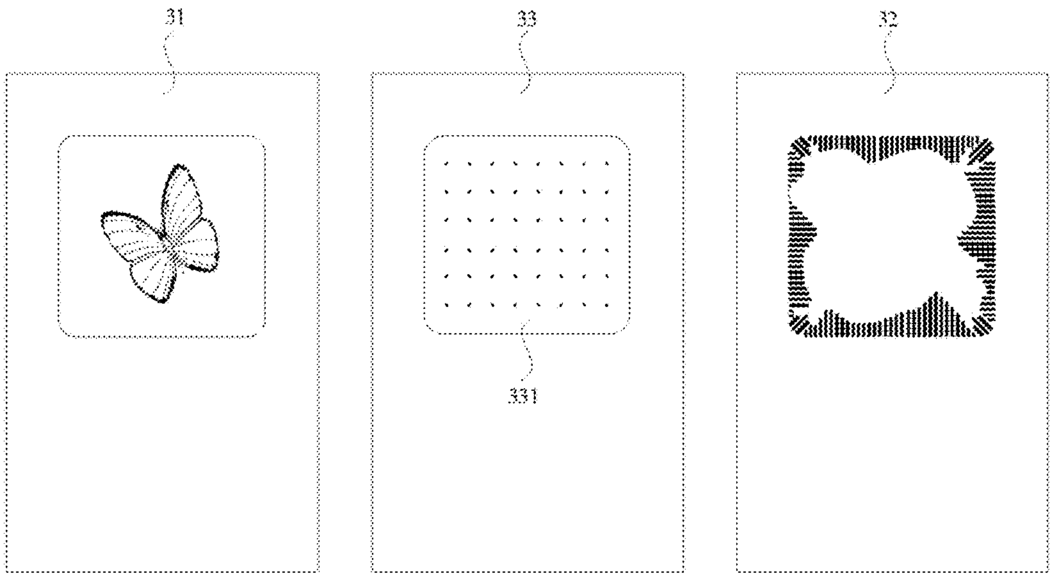
FIG. 3 is a first schematic diagram illustrating layers of a sound effect display interface provided by an embodiment of the present application.

In some implementations, referring to FIG. 3, the cover image is displayed on a first layer 31 of the sound effect display interface, and the plurality of sound wave columns are displayed on a second layer 32 of the sound effect display interface, and the second layer 32 is located above the first layer 31.

The sound effect display interface further includes a masking layer 33 located between the first layer 31 and the second layer 32. The masking layer 33 is configured to display a first image 331 with a first transparency, and an orthographic projection of the first image 331 coincides with an orthographic projection of the cover image 21, and a color of each pixel point of the first image 331 is a first color.

Exemplarily, the first transparency may be 35%, and the first color may be a background color of the sound effect display interface.

Because the orthographic projection of the first image coincides with the orthographic projection of the cover image, the first image has a shape, a size and a position as same as those of the cover image.

In the embodiment of the present application, since the masking layer for displaying the first image with the first transparency is arranged between the first layer for displaying the cover image and the second layer for displaying the plurality of sound wave columns, the cover image can be partially masked by the first image displayed on the masking layer in the embodiment of the present application, thus ensuring a clear display of the sound wave columns.

Figure 4:
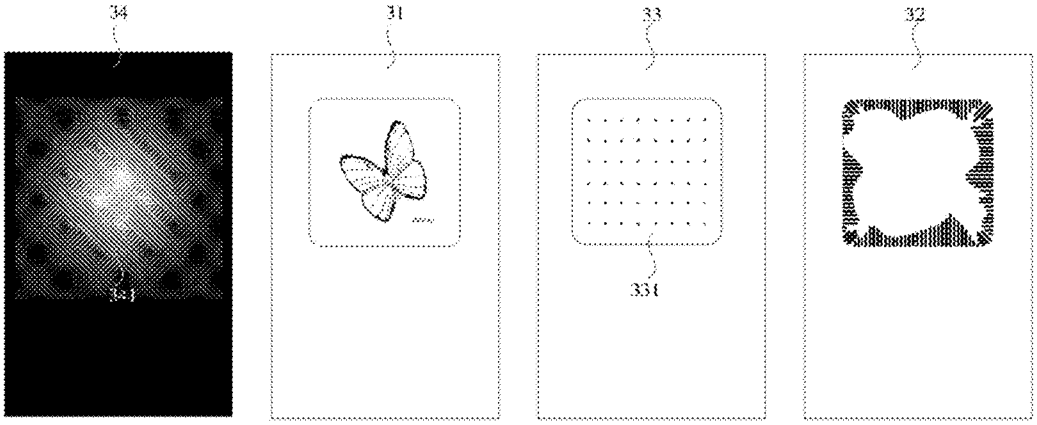
FIG. 4 is a second schematic diagram illustrating layers of a sound effect display interface provided by an embodiment of the present application.

In some implementations, referring to FIG. 4, the sound effect display interface further includes a luminous layer 34 located below the first layer 31.

The luminous layer 34 is configured to display a second image 341 obtained by performing a fuzzifying process to a third image. An orthographic projection of the third image coincides with the orthographic projection of the cover image, and a color of each pixel point of the third image is a second color.

Exemplarily, the second color may be a color of which a red component, a green component, and a blue component all have maximum values. For example, if the maximum values of the red, green and blue components are all 255, the second color can be a white color with red, green and blue components which all have a value of 255.

In some implementations, performing a fuzzifying process to the third image includes performing a Gaussian-fuzzifying process to the third image, where a parameter of Gaussian-fuzzifying can be 40. That is, a color value of each pixel point is set as an average value of a color value of the pixel point and color values of 40 adjacent pixel points of the pixel point.

The sound effect display interface provided by the embodiment of the present application further includes a luminous layer located below the first layer, thus the embodiment of the present application can increase the brightness around the cover image, thereby highlighting the cover image in the sound effect display interface and further improving the visual experience of the sound effect display interface.

Figure 5:
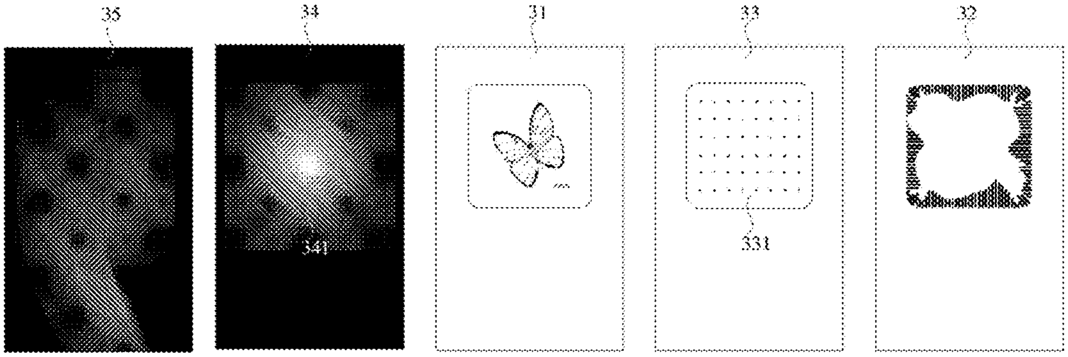
FIG. 5 is a third schematic diagram illustrating layers of a sound effect display interface provided by an embodiment of the present application.

In some implementations, referring to FIG. 5, a transparency of the second image 34 is a second transparency, and the sound effect display interface further includes a flashing layer 35 located below the luminous layer 34.

In the above-describe step S12, displaying the sound effect display interface corresponding to the target audio file includes the following steps a-c.

Step a, obtaining a ratio of a maximum value to a minimum value of a preset sound attribute of the target audio file in a current period.

Specifically, the maximum value and the minimum value of the preset sound attribute of the target audio file in each period can be obtained periodically with a preset time duration as a period, and the ratio of the maximum value to the minimum value of the preset sound attribute of the target audio file in the current period can be obtained according to the maximum value and the minimum value of the preset sound attribute of the target audio file in each period.

Figure 6:
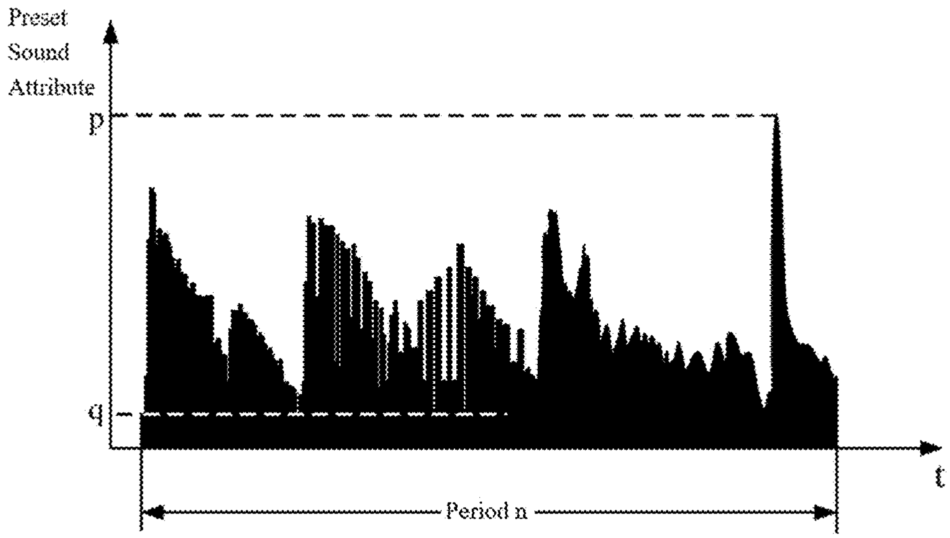
FIG. 6 is a schematic diagram of a maximum value and a minimum value of a preset sound attribute provided by an embodiment of the present application.

Exemplarily, referring to FIG. 6, in the nth period, the maximum value of the preset sound attribute of the target audio file is p, and the minimum value of the preset sound attribute of the target audio file is q, then the ratio of the maximum value to the minimum value of the preset sound attribute of the target audio file in the nth period is p/q.

Step b, determining a target flashing image according to the ratio and a preset corresponding relationship.

The preset corresponding relationship includes flashing images corresponding to respective ratio ranges, and the target flashing image is a flashing image corresponding to a ratio range to which the ratio belongs.

Exemplarily, the corresponding relationship between the ratio ranges and the flashing images can be shown in the following Table 1:

TABLE 1

| Ratio Range | Flashing Image |
|---|---|
| (+∞, 90] | Flashing Image 1 |
| (90, 80] | Flashing Image 2 |
| (80, 70] | Flashing Image 3 |
| (70, 60] | Flashing Image 4 |
| (60, 50] | Flashing Image 5 |
| (50, 40] | Flashing Image 6 |
| (40, 30] | Flashing Image 7 |
| (30, 20] | Flashing Image 8 |
| (20, 10] | Flashing Image 9 |
| (10, 1] | Flashing Image 10 |

Step c, controlling the target flashing image to be displayed on the flashing layer based on a preset transparency variation rule.

Exemplarily, when the time duration of one period is 1000 ms, the preset transparency variation rule can be as follows: the transparency increases from 0% to 35% at a uniform speed during the time from 0 to 400 ms; the transparency remains at 35% during the time from 400 ms to 600 sm; and the transparency decreases from 35% to 0% at a uniform speed during the time from 600 ms to 1000 sm. That is, the target flashing image is displayed on the flashing layer, and the transparency of the target flashing image is controlled to increase from 0% to 35% at a uniform speed during the time from 0 to 400 ms, to maintain at 35% during the time from 400 ms to 600 sm, and to decrease from 35% to 0% at a uniform speed during the time from 600 ms to 1000 sm.

In the above-described embodiment, the sound effect display interface further includes a flashing layer located below the luminous layer, and the displaying the sound effect display interface corresponding to the target audio file further includes: determining a target flashing image according to a ratio of a maximum value to a minimum value of the preset sound attribute of the target audio file in a current period, and controlling the target flashing image to be displayed on the flashing layer based on a preset transparency variation rule. Therefore, the above-described embodiment enables the sound effect display interface to be more dynamic through the flashing layer, thereby further improving the visual experience of the sound effect display interface.

In some implementations, on the basis of any of the above embodiments, the sound effect display interface in the embodiment of the present application further includes an underlying layer located at the bottom of the sound effect display interface and a background layer covering the underlying layer.

The underlying layer is configured to display an underlying image with a transparency of 0%, and the underlying image has a shape and a size as same as those of the sound effect display interface, with all the pixel points having the same color. The background layer is configured to display a background image, and a transparency of the background image is a third transparency. The underlying image has a shape and a size as same as those of the sound effect display interface, with all the pixel points having the same color.

Exemplarily, the color of each pixel point of the underlying image is a black color or a dark black-blue color, and the color of each pixel point of the background image is determined according to the cover image, and the third transparency is 30%.

As an implementation of the embodiment of the present application, before the above-described step S12 (displaying the sound effect display interface), the sound effect display method provided by the embodiment of the present application further includes the following steps 1 to 3.

Step 1: acquiring an original image corresponding to the target audio file.

Specifically, the original image corresponding to the target audio file may be a cover image of an album to which the target audio file belongs, a portrait image of an author of the target audio file, a preset image for summarizing a content of the target audio file and the like, which is not limited in the embodiment of the present application.

Step 2, obtaining a first color component, a second color component, and a third color component of each pixel point in the original image.

For example, when the original image is an image in a RGB color space, a red component, a green component, and a blue component of each pixel point are obtained.

Step 3, offsetting the first color component and the second color component of each pixel point in the original image respectively to obtain the cover image corresponding to the target audio file.

The first color component and the second color component are different from each other in an offset direction and/or an offset distance.

That is, the first color component, the second color component, and the third color component of each pixel point in the original image are separated to obtain the cover image corresponding to the target audio file.

In some implementations, when the first color component, the second color component, and the third color component are a red component, a green component, and a blue component, respectively, the red component can be offset by 3 ps in a first direction and the green component can be offset by 3 ps in a second direction opposite to the first direction, so as to obtain the cover image corresponding to the target audio file.

It is to be noted that in the above-described embodiment, the first color component, the second color component and the third color component are described as a red component, a green component and a blue component respectively by way of example, but the embodiment of the present application is not limited to separating the red component, the green component, and the blue component by offsetting the red component and the green component. In practical operation, the red component, the green component, and the blue component can be separated by offsetting any two of these color components. For example, the red component, the green component, and the blue component can be separated by offsetting the red component and the blue component; and for another example, the red component, the green component, and the blue component can be separated by offsetting the green component and the blue component.

In the above-described embodiment, the first color component, the second color component, and the third color component of each pixel point in the cover image corresponding to the target audio file as obtained are separated, so that the above-described embodiment enables the sound effect display interface containing the cover image to be more impactful, thereby further improving the visual experience of the sound effect display interface.

In some implementations, a maximum extension length of the sound wave column is a preset length.

That is, each sound wave column extends within the range of [0, preset length].

Figure 7:
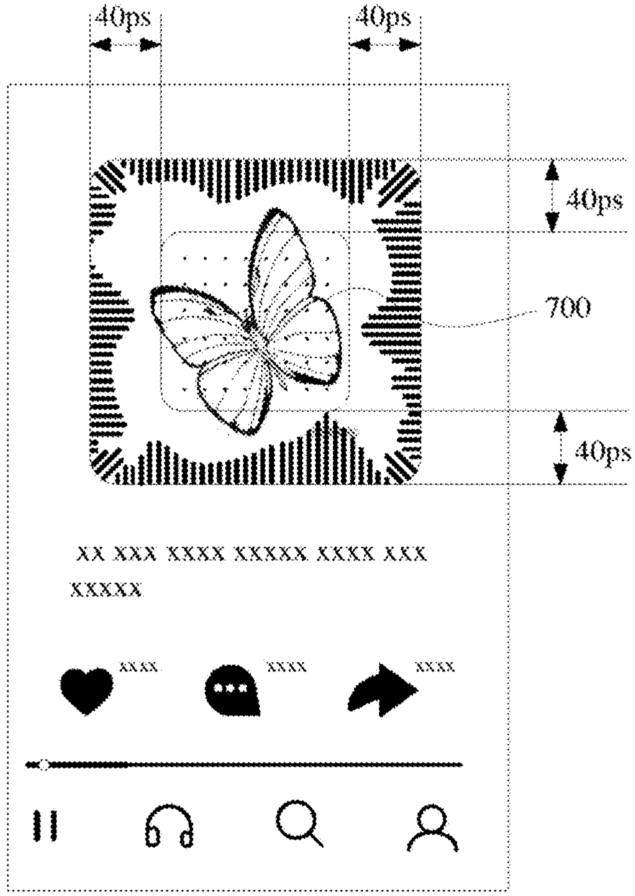
FIG. 7 is a schematic diagram of an extension range of a sound wave column provided by an embodiment of the present application.

Exemplarily, as shown in FIG. 7, the above-described embodiment is explained in FIG. 7 with reference to the case where the preset length is a distance of 40 pixels (40 ps) by way of example. As shown in FIG. 7, since the maximum extension length of the sound wave column is the preset length, the sound wave column will not be displayed in a central area 700 of the cover image. Therefore, the above-described embodiment can prevent the sound wave column from affecting the display of the cover image.

In some implementations, the cover image is scaled up and scaled down within a preset scaling range.

Exemplarily, the preset scaling range may be [80%, 100%].

Figure 8:
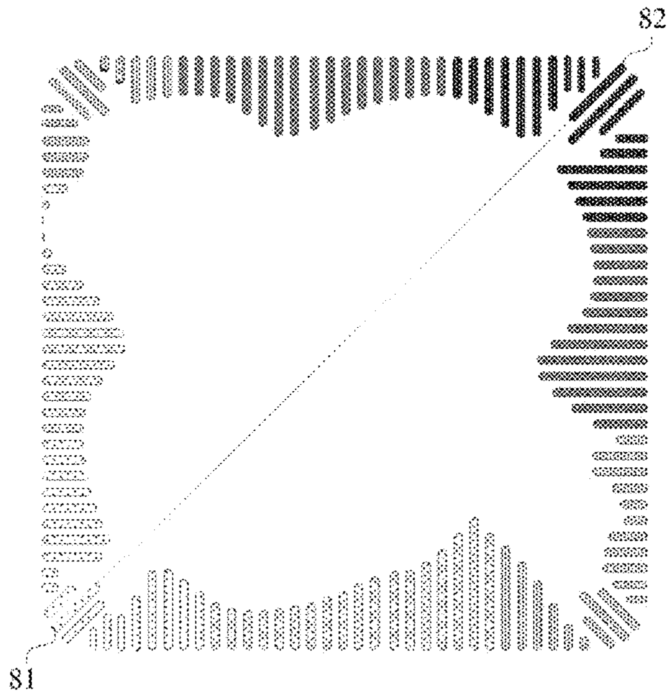
FIG. 8 is a schematic diagram illustrating a color of a sound wave column provided by an embodiment of the present application.

In some implementations, referring to FIG. 8, a color of a first sound wave column 81 of the plurality of sound wave columns is a third color, and a color of a second sound wave column 82 of the plurality of sound wave columns is a fourth color.

The color of the sound wave column located between the first sound wave column 81 and the second sound wave column 82 of the plurality of sound wave columns is gradually varied from the third color to the fourth color.

In some implementations, the first sound wave column and the second sound wave column both are sound wave columns having initial positions located on a target straight line. The target straight line is a straight line that passes through a geometric center of the cover image and has a preset angle with respect to a horizontal direction. Exemplarily, the preset angle may be 45 degrees.

In some implementations, before the above-described step S12 (displaying the sound effect display interface corresponding to the target audio file), the sound effect display method provided by the embodiment of the present application further includes: determining the third color, the fourth color, and a background color of the sound effect display interface according to a color of the cover image.

In some implementations, the implementation of determining the third color, the fourth color, and the background color of the sound effect display interface according to the color of the cover image may include the following steps I to III.

Step I, obtaining an average color value of pixel points of the cover image.

That is, a color value of each pixel point of the cover image is obtained, and the color values of respective pixel points are added together and then divided by the number of the pixel points in the cover image to obtain the average color value of the pixel points of the cover image.

Step II, converting the average color value into a color in HSV color space to obtain a base color.

Specifically, the HSV color space is a color space that represents colors by hue (Hue), saturation (Saturation), and brightness (Value). Any color in the HSV color space includes a parameter H for representing the hue, a parameter S for representing the saturation, and a parameter V for representing the value.

There are specific conversion formulas between colors in different color spaces, so a conversion formula can be determined according to the color space to which the cover image belongs, and then the average color value can be converted according to the determined conversion formula to obtain the base color. For example, if the cover image belongs to RGB color space, the average color value is converted according to a conversion formula between RGB color space and HSV color space to obtain the base color.

Step III, determining the third color, the fourth color, and the background color of the sound effect display interface according to the base color.

In some implementations, the determining the third color according to the base color includes: determining that a hue of the third color is as same as a hue of the base color; determining that a saturation of the third color is as same as a saturation of the base color if the saturation of the base color is greater than or equal to a threshold saturation; and determining that the saturation of the third color is a sum of the saturation of the base color and a preset saturation if the saturation of the base color is smaller than the threshold saturation; and determining that a value of the third color is a maximum value.

Given: the hue, the saturation, and the value of the base color are $H_0$, $S_0$ and $V_0$, respectively; the hue, the saturation, and the value of the third color are $H_1$, $S_1$ and $V_1$, respectively; the threshold saturation is $S_{thre_{shold}}$, and the preset saturation is a, then, $$H_1 = H_0$$

$$S_1 = \begin{cases} S_0 & S_0 \geq S_{threshold} \\ S_0 + a & S_0 < S_{threshold} \end{cases}$$

$$V_1 = 100$$

In some implementations, the determining the fourth color according to the base color includes: determining that a hue of the fourth color is a sum of a hue of the base color and a preset hue; determining that a saturation of the fourth color is as same as a saturation of the base color if the saturation of the base color is greater than or equal to a threshold saturation; and determining that the saturation of the fourth color is a sum of the saturation of the base color and a preset saturation if the saturation of the base color is smaller than the threshold saturation; and determining that a value of the fourth color is a maximum value.

Given: the hue, the saturation, and the value of the base color are $H_0$, $S_0$ and $V_0$, respectively; the hue, the saturation, and the value of the fourth color are $H_2$, $S_2$ and $V_2$, respectively; the threshold saturation is $S_{thre_{shold}}$, the preset saturation is a, and the preset hue is b, then, $$H_2 = H_0 + b.$$

$$S_2 = \begin{cases} S_0 & S_0 \geq S_{threshold} \\ S_0 + a & S_0 < S_{threshold} \end{cases}$$

$$V_2 = 100.$$

In some implementations, the determining the background color according to the base color includes: determining that a hue of the background color is as same as a hue of the base color; determining that a saturation of the background color is as same as a saturation of the base color if the saturation of the base color is greater than or equal to a threshold saturation; and determining that the saturation of the background color is a sum of the saturation of the base color and a preset saturation if the saturation of the base color is smaller than the threshold saturation; and determining that a value of the background color is a difference between a value of the base color and a target value, the target value is a value corresponding to a value range to which the value of the base color belongs, and the value corresponding to the value range is positively correlated with a central value of the value range.

For example, the corresponding relationship between the value range and the value is shown in the following Table 2:

TABLE 2

| Value Range | Corresponding Value |
|---|---|
| [100, 90] | 55 |
| [90, 80] | 50 |
| [80, 70] | 45 |
| [70, 60] | 40 |
| [60, 50] | 35 |
| [50, 40] | 30 |
| [40, 30] | 25 |
| [30, 25] | 20 |
| [25, 20] | 15 |
| [20, 15] | 10 |
| [15, 10] | 7 |
| [10, 5] | 3 |
| [5, 0] | 2 |

Given: the hue, the saturation, and the value of the base color are $H_0$, $S_0$ and $V_0$, respectively; the hue, the saturation, and the value of the background color are $H_3$, $S_3$ and $V_3$, respectively; the threshold saturation is $S_{thre_{shold}}$, the preset saturation is a, and the corresponding relationship between the value range and the value is as shown in Table 2 above, there will be:

$$H_3 = H_0.$$

$$S_3 = \begin{cases} S_0 & S_0 \geq S_{threshold} \\ S_0 + a & S_0 < S_{threshold} \end{cases}$$

$$V_3 = V_0 - c.$$

Where, when $100 \geq V_0 \geq 90$, c=55; when $90 > V_0 \geq 80$, c=50; when $80 > V_0 \geq 70$, c=45; when $70 \geq V_0 \geq 60$, c=40; when $60 > V_0 \geq 50$, c=35; when $50 > V_0 \geq 40$, c=30; when $40 > V_0 \geq 30$, c=25; when $30 > V_0 \geq 25$, c=20; when $25 > V_0 \geq 20$, c=15; when $20 > V_0 \geq 15$, c=15; when $15 > V_0 \geq 10$, c=7; when $10 > V_0 \geq 5$, c=3; and when $5 > V_0 \geq 0$, c=2.

The above-described embodiment can determine the third color, the fourth color, and the background color in the sound effect display interface according to the cover image of the audio file. Therefore, the color of the sound effect display interface in the embodiment of the present application can be more matched and correlated with that of the cover image, thereby improving the visual experience of users.

Based on the same inventive concept, as an implementation of the above-described method, the embodiment of the present application also provides a terminal device, and the device embodiment is corresponding to the above-described method embodiment. For the convenience of reading, the details and contents of the above-described method embodiment will not be particularly repeated one by one in the device embodiment. However, it is to be noted that the terminal device in this embodiment can realize all the contents of the above-described method embodiment correspondingly.

Figure 9:
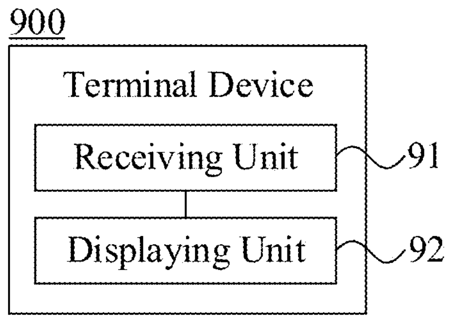
FIG. 9 is a schematically structural diagram of a terminal device provided by an embodiment of the present application.

The embodiment of the present application provides a terminal device. FIG. 9 is a schematically structural diagram of the terminal device. As shown in FIG. 9, the terminal device 900 includes: a receiving unit 91 configured to receive a first operation that is input to a target audio file; and a displaying unit 92 configured to display a sound effect display interface corresponding to the target audio file in response to the first operation. The sound effect display interface includes a cover image corresponding to the target audio file and a plurality of sound wave columns arranged along an edge of the cover image; the cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file.

In some implementations, the cover image is displayed on a first layer of the sound effect display interface, and the plurality of sound wave columns are displayed on a second layer of the sound effect display interface, and the second layer is located above the first layer.

The sound effect display interface further includes a masking layer located between the first layer and the second layer. The masking layer is configured to display a first image with a first transparency, and an orthographic projection of the first image coincides with an orthographic projection of the cover image, and a color of each pixel point in the first image is a first color.

In some implementations, the sound effect display interface further includes a luminous layer located below the first layer.

The luminous layer is configured to display a second image obtained by performing a fuzzifying process to a third image. An orthographic projection of the third image coincides with the orthographic projection of the cover image, and a color of each pixel point in the third image is a second color.

In some implementations, a transparency of the luminous layer is a second transparency, and the sound effect display interface further includes a flashing layer located below the luminous layer.

The displaying unit 92 is specifically configured to obtain a ratio of a maximum value to a minimum value of a preset sound attribute of the target audio file in a current period; determine a target flashing image according to the ratio and a preset corresponding relationship including flashing images corresponding to respective ratio regions, with the target flashing image being a flashing image corresponding to a ratio range to which the ratio belongs; and control the target flashing image to be displayed on a flashing layer based on a preset transparency variation rule.

In some implementations, the displaying unit 92 is further configured to acquire an original image corresponding to the target audio file before displaying the sound effect display interface; obtain a first color component, a second color component, and a third color component of each pixel point in the original image; offset the first color component and the second color component of each pixel point in the original image respectively to obtain the cover image corresponding to the target audio file.

The first color component and the second color component are different from each other in an offset direction and/or an offset distance.

In some implementations, a maximum extension length of the sound wave column is a preset length, and the cover image is scaled up and scaled down within a preset scaling range.

In some implementations, a color of a first sound wave column of the plurality of sound wave columns is a third color, and a color of a second sound wave column of the plurality of sound wave columns is a fourth color.

The color of the sound wave column located between the first sound wave column and the second sound wave column of the plurality of sound wave columns is gradually varied from the third color to the fourth color.

In some implementations, the displaying unit 92 is further configured to: obtain an average color value of pixel points of the cover image before displaying the sound effect display interface corresponding to the target audio file; convert the average color value into a color in an HSV color space to obtain a base color; and determine the third color, the fourth color and a background color of the sound effect display interface according to the base color.

In some implementations, the displaying unit 92 is specifically configured to: determine that a hue of the third color is as same as a hue of the base color; determine that a saturation of the third color is as same as a saturation of the base color if the saturation of the base color is greater than or equal to a threshold saturation, and determine that the saturation of the third color is a sum of the saturation of the base color and a preset saturation if the saturation of the base color is smaller than the threshold saturation; and determine that a value of the third color is a maximum value.

In some implementations, the displaying unit 92 is specifically configured to: determine that a hue of the fourth color is a sum of a hue of the base color and a preset hue; determine that a saturation of the fourth color is as same as a saturation of the base color if the saturation of the base color is greater than or equal to a threshold saturation, and determine that the saturation of the fourth color is a sum of the saturation of the base color and a preset saturation if the saturation of the base color is smaller than the threshold saturation; and determine that a value of the fourth color is a maximum value.

In some implementations, the displaying unit 92 is specifically configured to: determine that a hue of the background color is as same as a hue of the base color; determine that a saturation of the background color is as same as a saturation of the base color if the saturation of the base color is greater than or equal to a threshold saturation, and determine that the saturation of the background color is a sum of the saturation of the base color and a preset saturation if the saturation of the base color is smaller than the threshold saturation; and determine that a value of the background color is a difference between a value of the base color and a target value, the target value is a value corresponding to a value range to which the value of the base color belongs, and the value corresponding to the value range is positively correlated with a central value of the value range.

In some implementations, the first sound wave column and the second sound wave column both are sound wave columns having initial positions located on a target straight line. The target straight line is a straight line that passes through a geometric center of the cover image and has a preset angle with respect to a horizontal direction.

In some implementations, the cover image is scaled up or scaled down according to the preset sound attribute of the target audio file, which includes the case that the cover image is scaled up or scaled down according to a scaling factor row corresponding to a scaling factor corresponding to an attribute value of the preset sound attribute of a key audio frame of the target audio file; the scaling factor corresponding to the attribute value of the preset sound attribute of the key audio frame of the target audio file is determined according to a pre-established corresponding relationship between the scaling factor and the attribute value of the preset sound attribute.

In some implementations, the plurality of sound wave columns extend towards the area where the cover image is located along the direction perpendicular to the edge of the cover image according to the preset sound attribute of the target audio file, which includes the case that the plurality of sound wave columns extend towards the area where the cover image is located along the direction perpendicular to the edge of the cover image according to a determined extension length; an extension length of each sound wave column is determined according to a waveform corresponding to the attribute value of the preset sound attribute of the key audio frame of the target audio file.

The terminal device provided in this embodiment can carry out the sound effect display method provided in the above-described method embodiment with the same implementation principle and the same technical effect, without particularly repeated here.

Figure 10:
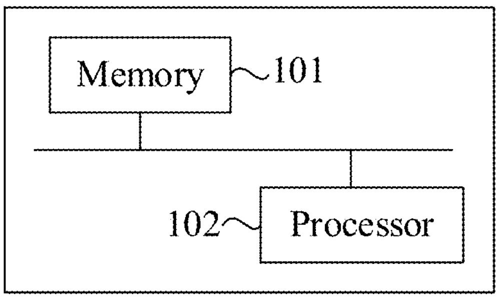
FIG. 10 is a schematic diagram of a hardware structure of an electronic apparatus provided by an embodiment of the present application.

Based on the same inventive concept, the embodiment of the present application also provides an electronic apparatus. FIG. 10 is a schematically structural diagram of an electronic apparatus provided by an embodiment of the present application. As shown in FIG. 10, the electronic apparatus provided by this embodiment includes a memory 101 and a processor 102, the memory 101 is configured for storing a computer program; and the processor 102 is configured to enable the electronic apparatus to realize the sound effect display method provided in the above-described embodiment upon the processor 102 calling the computer program.

The embodiment of the present application also provides a computer-readable storage medium having a computer program stored thereon, and the computer program enables a computing apparatus to realize the sound effect display method provided in the above-described embodiment upon the computer program being executed by the computing apparatus.

The embodiment of the present application also provides a computer program product, which enables a computer to realize the sound effect display method provided in the above-described embodiment upon the computer program product being executed on the computer.

It is to be understood by those skilled in the art that embodiments of the present application may be provided as a method, a system, or a computer program product. Therefore, the present application may take the form of an entirely hardware embodiment, an entirely software embodiment, or an embodiment combining software aspect and hardware aspect. Furthermore, the present application may take the form of a computer program product embodied on one or more computer usable storage mediums having computer usable program codes included therein.

The processor can be a central processing unit (CPU), and can also be other general processors, a digital signal processor (DSP), an application specific integrated circuit (ASIC), a field-programmable gate array (FPGA) or other programmable logic devices, a discrete gate or a transistor logic device, a discrete hardware component or the like. The general processor can be a microprocessor, or the processor can also be any conventional processor or the like.

The memory may include the form of a non-permanent memory, a random-access memory (RAM) and/or a non-volatile memory in a computer-readable medium, such as a read-only memory (ROM) or a flash memory. The memory is an example of the computer-readable medium.

The computer-readable medium includes a permanent or non-permanent, removable or non-removable storage medium. The storage medium can store information by any method or technology, and the information can be computer-readable instructions, data structures, program modules or other data. Examples of the storage medium for computers include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic cassette, magnetic disk storage or other magnetic storage devices or any other non-transmission medium, which can be used for storing information accessible by a computing apparatus. According to the definition in the present application, the computer-readable medium does not include computer-readable transitory media, such as modulated data signals and carrier waves.

Finally, it is to be noted that the above embodiments are only used to illustrate, not restrict the technical solutions of the present application. Although the present application is described in detail with reference to the above embodiments, it is to be understood for one of ordinary skill in the art that it is still possible to make modification to the technical solutions recorded in the above embodiments, or make equivalent substitution to some or all of the technical features therein, and such modifications or substitutions will not make the nature of the corresponding technical solutions depart from the scope of the technical solutions of the embodiments of the present application.

What is claimed is:

1. A sound effect display method, comprising:

receiving a first operation that is input to a target audio file; and displaying a sound effect display interface corresponding to the target audio file in response to the first operation, wherein the sound effect display interface comprises a cover image corresponding to the target audio file and a plurality of sound wave columns arranged along an edge of the cover image; the cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file, wherein the cover image is displayed on a first layer of the sound effect display interface, and the plurality of sound wave columns are displayed on a second layer of the sound effect display interface, and the second layer is located above the first layer;

the sound effect display interface further comprises a masking layer located between the first layer and the second layer; the masking layer is configured to display a first image with a first transparency, and an orthographic projection of the first image coincides with an orthographic projection of the cover image, and a color of each pixel point of the first image is a first color.

2. The method according to claim 1, wherein the sound effect display interface further comprises: a luminous layer located below the first layer;

the luminous layer is configured to display a second image, the second image is obtained by performing a fuzzifying process to a third image, and an orthographic projection of the third image coincides with the orthographic projection of the cover image, and a color of each pixel point of the third image is a second color.

3. The method according to claim 2, wherein a transparency of the second image is a second transparency, and the sound effect display interface further comprises: a flashing layer located below the luminous layer;

the displaying the sound effect display interface of the target audio file comprises:

obtaining a ratio of a maximum value to a minimum value of the preset sound attribute of the target audio file in a current period;

determining a target flashing image according to the ratio and a preset corresponding relationship, wherein the preset corresponding relationship comprises flashing images corresponding to respective ratio ranges, and the target flashing image is a flashing image corresponding to a ratio range to which the ratio belongs; and controlling the target flashing image to be displayed on the flashing layer based on a preset transparency variation rule.

4. The method according to claim 1, wherein, before displaying the sound effect display interface, the method further comprises:

obtaining an original image corresponding to the target audio file;

obtaining a first color component, a second color component, and a third color component of each pixel point in the original image; and offsetting the first color component and the second color component of each pixel point in the original image, respectively, to obtain the cover image corresponding to the target audio file, wherein the first color component and the second color component are different in an offset direction and/or an offset distance.

5. The method according to claim 1, wherein a maximum extension length of the sound wave column is a preset length, and the cover image is scaled up and scaled down within a preset scaling range.

6. The method according to claim 1, wherein a color of a first sound wave column among the plurality of sound wave columns is a third color, and a color of a second sound wave column among the plurality of sound wave columns is a fourth color; and a color of a sound wave column located between the first sound wave column and the second sound wave column among the plurality of sound wave columns is gradually varied from the third color to the fourth color.

7. The method according to claim 6, wherein, before displaying the sound effect display interface corresponding to the target audio file, the method further comprises:

obtaining an average color value of pixel points of the cover image;

converting the average color value into a color in an HSV color space to obtain a base color; and determining the third color, the fourth color, and a background color of the sound effect display interface according to the base color.

8. The method according to claim 7, wherein the determining the third color according to the base color comprises:

determining that a hue of the third color is as same as a hue of the base color;

determining that a saturation of the third color is as same as a saturation of the base color if the saturation of the base color is greater than or equal to a threshold saturation; determining that the saturation of the third color is a sum of the saturation of the base color and a preset saturation if the saturation of the base color is smaller than the threshold saturation; and determining that a value of the third color is a maximum value.

9. The method according to claim 7, wherein the determining the fourth color according to the base color comprises:

determining that a hue of the fourth color is a sum of a hue of the base color and a preset hue;

determining that a saturation of the fourth color is as same as a saturation of the base color if the saturation of the base color is greater than or equal to a threshold saturation; determining that the saturation of the fourth color is a sum of the saturation of the base color and a preset saturation if the saturation of the base color is smaller than the threshold saturation; and determining that a value of the fourth color is a maximum value.

10. The method according to claim 7, wherein the determining the background color according to the base color comprises:

determining that a hue of the background color is as same as a hue of the base color;

determining that a saturation of the background color is as same as a saturation of the base color if the saturation of the base color is greater than or equal to a threshold saturation; determining that the saturation of the background color is a sum of the saturation of the base color and a preset saturation if the saturation of the base color is smaller than the threshold saturation; and determining that a value of the background color is a difference between a value of the base color and a target value, wherein the target value is a value corresponding to a value range to which the value of the base color belongs, and the value corresponding to the value range is positively correlated with a central value of the value range.

11. The method according to claim 6, wherein the first sound wave column and the second sound wave column are sound wave columns having initial positions located on a target straight line, respectively; the target straight line is a straight line that passes through a geometric center of the cover image and has a preset angle with respect to a horizontal direction.

12. The method according to claim 1, wherein the cover image is scaled up or scaled down according to the preset sound attribute of the target audio file, which comprises the case that:

the cover image is scaled up or scaled down according to a scaling factor row corresponding to a scaling factor corresponding to an attribute value of the preset sound attribute of a key audio frame of the target audio file, wherein the scaling factor corresponding to the attribute value of the preset sound attribute of the key audio frame of the target audio file is determined according to a pre-established corresponding relationship between the scaling factor and the attribute value of the preset sound attribute.

13. The method according to claim 1, wherein the plurality of sound wave columns extend towards an area where the cover image is located along the direction perpendicular to the edge of the cover image according to the preset sound attribute of the target audio file, which comprises the case that:

the plurality of sound wave columns extend towards the area where the cover image is located along the direction perpendicular to the edge of the cover image according to a determined extension length, wherein an extension length of each sound wave column is determined according to a waveform corresponding to an attribute value of the preset sound attribute of a key audio frame of the target audio file.

14. A terminal device, comprising:

a receiving unit configured to receive a first operation that is input to a target audio file; and a displaying unit configured to display a sound effect display interface corresponding to the target audio file in response to the first operation, wherein the sound effect display interface comprises a cover image corresponding to the target audio file and a plurality of sound wave columns arranged along an edge of the cover image; the cover image is scaled up or scaled down according to a preset sound attribute of the target audio file, and the plurality of sound wave columns extend towards an area where the cover image is located along a direction perpendicular to the edge of the cover image according to the preset sound attribute of the target audio file to form a sound wave waveform corresponding to the preset sound attribute of the target audio file, wherein, the cover image is displayed on a first layer of the sound effect display interface, and the plurality of sound wave columns are displayed on a second layer of the sound effect display interface, and the second layer is located above the first layer, and the sound effect display interface further comprises a masking layer located between the first layer and the second layer; the masking layer is configured to display a first image with a first transparency, and an orthographic projection of the first image coincides with an orthographic projection of the cover image, and a color of each pixel point of the first image is a first color.

15. An electronic apparatus, comprising a memory and a processor, wherein the memory is configured for storing a computer program; and the processor is configured to enable the electronic apparatus to realize the sound effect display method according to claim 1 upon the processor calling and executing the computer program.

16. A non-transitory computer-readable storage medium, wherein a computer program is stored thereon, and the computer program enables a computing apparatus to realize the sound effect display method according to claim 1 upon the computer program being executed by the computing apparatus.

17. A non-transitory computer program product, wherein the computer program product enables a computer to realize the sound effect display method according to claim 1 upon the computer program product being executed on the computer.

18. The method according to claim 1, wherein a color of a first sound wave column among the plurality of sound wave columns is a third color, and a color of a second sound wave column among the plurality of sound wave columns is a fourth color; and a color of a sound wave column located between the first sound wave column and the second sound wave column among the plurality of sound wave columns is gradually varied from the third color to the fourth color.

19. The method according to claim 18, wherein, before displaying the sound effect display interface corresponding to the target audio file, the method further comprises:

obtaining an average color value of pixel points of the cover image;

converting the average color value into a color in an HSV color space to obtain a base color; and determining the third color, the fourth color, and a background color of the sound effect display interface according to the base color.

* * * * *